US011999123B2

(12) United States Patent
Härtlein et al.

(10) Patent No.: US 11,999,123 B2
(45) Date of Patent: Jun. 4, 2024

(54) DEVICE AND METHOD FOR SEPARATING MATERIALS OF DIFFERENT FLOWABILITY THAT ARE MIXED TOGETHER

(71) Applicant: Nordischer Maschinenbau Rud. Baader GmbH + Co. KG, Lübeck (DE)

(72) Inventors: Joachim Härtlein, Bad Schwartau (DE); Julia Fleischmann, Lübeck (DE); Christian Denker, Klingberg/Scharbeutz (DE); Michael Fuchs, Pönitz (DE)

(*) Notice: Subject to any disclaimer, the term of this patent is extended or adjusted under 35 U.S.C. 154(b) by 452 days.

(21) Appl. No.: 17/311,898

(22) PCT Filed: Dec. 9, 2019

(86) PCT No.: PCT/EP2019/084165
§ 371 (c)(1),
(2) Date: Jun. 8, 2021

(87) PCT Pub. No.: WO2020/120374
PCT Pub. Date: Jun. 18, 2020

(65) Prior Publication Data
US 2022/0024167 A1    Jan. 27, 2022

(30) Foreign Application Priority Data

Dec. 10, 2018 (DE) .......................... 102018131533.3

(51) Int. Cl.
*A22C 17/04* (2006.01)
*B30B 9/24* (2006.01)
(52) U.S. Cl.
CPC .............. B30B 9/241 (2013.01); *A22C 17/04* (2013.01)

(58) Field of Classification Search
CPC ..... B30B 9/241; A22B 5/0035; A22C 17/004; A22C 17/04
See application file for complete search history.

(56) References Cited

U.S. PATENT DOCUMENTS 3,734,000 A * 5/1973 Ziener .................... B30B 9/241
100/153
4,475,453 A   10/1984 Davis
(Continued)

FOREIGN PATENT DOCUMENTS

DE    3516623 A1   11/1985
DE    3903022 C1    4/1990
(Continued)

OTHER PUBLICATIONS

International Search Report dated Feb. 21, 2020; International Application PCT/EP2019/084165.

*Primary Examiner* — Matthew Katcoff
(74) *Attorney, Agent, or Firm* — Dinsmore & Shohl LLP

(57) ABSTRACT

An apparatus for separating mixed materials of different flowability includes a frame structure, a hollow drum with a perforated peripheral surface driven in rotation and mounted on the structure, a continuous compression belt pressed against the peripheral surface from outside when wrapped around part of the drum circumference and driven in circulation, a product intake wedge formed by the belt and drum for conducting a product stream, into the apparatus between the drum and the belt in an inlet area of the product stream, and a support apparatus for the belt, with at least one support element which is arranged on the side of the belt opposite the drum, wherein the support element is configured as a roller track with at least partially spring-mounted rollers arranged successively in the conveying direction. The spring force of at least individual rollers is controllable. A corresponding method is also provided.

19 Claims, 1 Drawing Sheet

(56) References Cited

U.S. PATENT DOCUMENTS

| | | | |
|---|---|---|---|
| 4,637,094 A | | 1/1987 | Matsubayashi |
| 5,057,167 A | * | 10/1991 | Gersbeck ................. B27N 3/26 |
| | | | 264/40.5 |
| 8,689,682 B2 | * | 4/2014 | Rose ........................ A23N 4/08 |
| | | | 210/402 |
| 2021/0037837 A1 | * | 2/2021 | Günther ................. A22C 17/04 |

FOREIGN PATENT DOCUMENTS

| | | |
|---|---|---|
| DE | 29605004 U1 | 7/1997 |
| DE | 102014117973 A1 | 6/2016 |
| EP | 1389510 A2 | 2/2004 |
| WO | 2011092087 A1 | 8/2011 |

\* cited by examiner

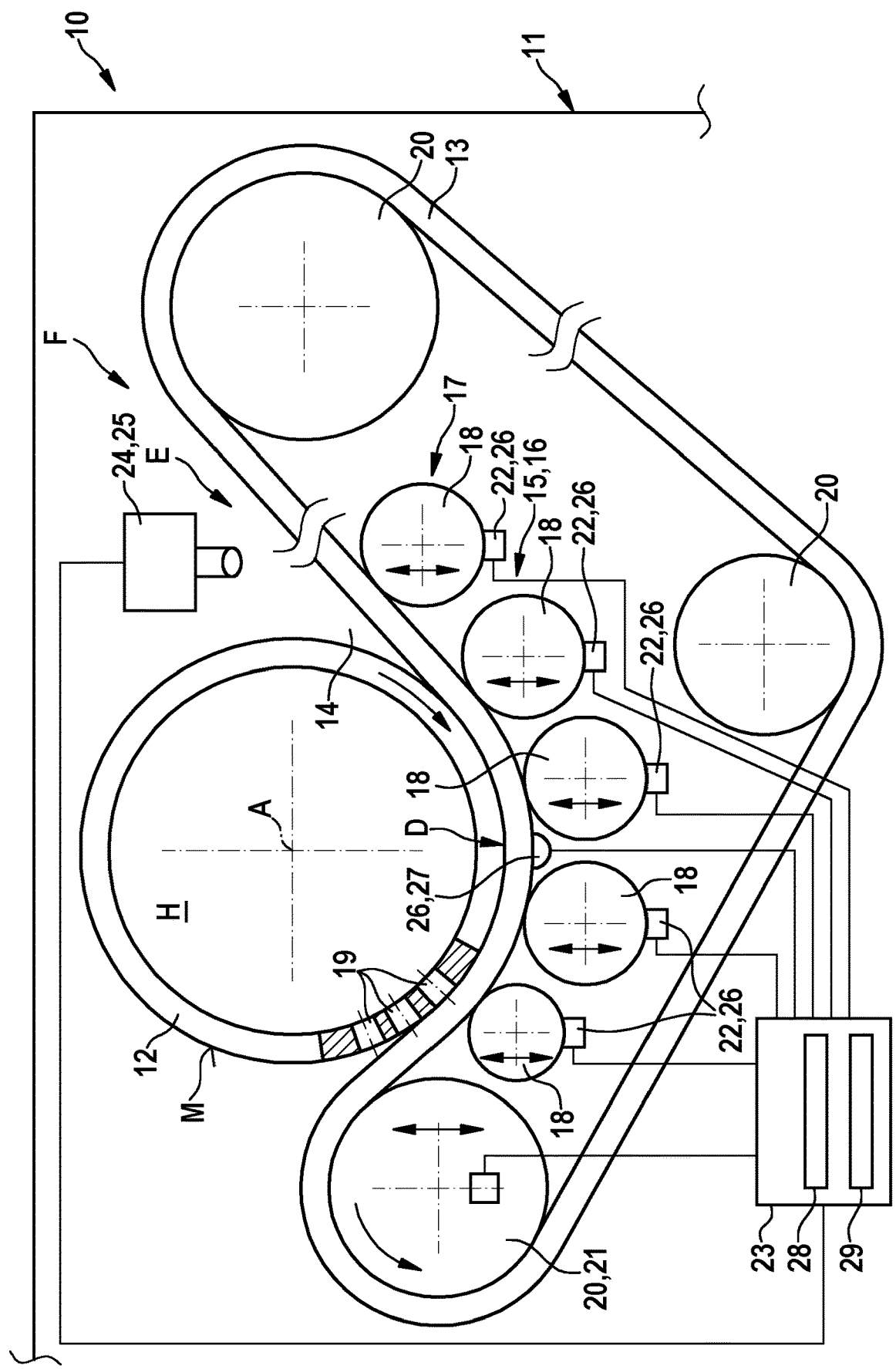

DEVICE AND METHOD FOR SEPARATING MATERIALS OF DIFFERENT FLOWABILITY THAT ARE MIXED TOGETHER

CROSS REFERENCE TO RELATED APPLICATION

This application is the U.S. National Stage of PCT/EP2019/084165 filed Dec. 9, 2019, which claims priority to Germany Application No. 102018131533.3, filed Dec. 10, 2018, the entire content of both are incorporated herein by reference in their entirety.

SUMMARY OF THE INVENTION

The invention concerns an apparatus for separating materials of different flowability that are mixed together, comprising a frame structure; a hollow drum with perforated peripheral surface M which is driven in rotation and mounted on the frame structure; a continuous compression belt which can be pressed against said peripheral surface from the outside when wrapped around part of the circumference of said hollow drum and which is driven in circulation; a product intake wedge formed by the compression belt and hollow drum for conducting a product stream, comprising a product to be pressed, into the apparatus between the hollow drum and the compression belt in an inlet area E of the product stream; and a support apparatus for the compression belt, with at least one support element which is arranged on the side of the compression belt opposite the hollow drum, wherein the support element is configured as a roller track comprising several rollers which are arranged successively in the conveying direction F of the product stream and at least partially spring-mounted.

The invention furthermore concerns a method for separating materials of different flowability that are mixed together, comprising the steps: supply of a product stream, comprising a product to be pressed, into a product intake wedge which is formed by a hollow drum with perforated peripheral surface M and a compression belt which lies on the hollow drum from the outside, wrapped around part of the circumference; driving the hollow drum and/or the compression belt in circulation in order to draw in the product stream between the hollow drum and the compression belt; wherein the more easily flowing constituents of the product stream are pressed into the inner hollow chamber of the hollow drum by means of the compression belt through the perforations of the peripheral surface M of the hollow drum and discharged, while the less easily flowing constituents of the product stream remain on the outside of the peripheral surface M of the hollow drum and are discharged separately; wherein on the side of the compression belt opposite the hollow drum, the compression belt is supported by a roller track as a support element, which comprises several at least partially spring-mounted rollers arranged successively in the conveying direction F of the product stream.

Substances, materials or products which differ in their composition by their mutually different flow behavior are accessible for separation. The possibility and/or need for separating materials of different flowability that are mixed together exists for example when processing animal carcasses (e.g. separating the meat from the skin, tendons, hair, bones or fish bones etc.) or parts thereof, when processing fruit and vegetables (e.g. separating the fruit flesh from the peel, stem, core or stones etc.), when processing incorrectly packed foodstuffs (e.g. separating butter or cheese from packing material) or similar. Concrete application examples are for example coring dates or unpacking foil-packed cheese slices.

During processing, coring or unpacking or any other corresponding separation, a product stream is conveyed from a product supply region between the pressing element, e.g. the compression belt, and the hollow drum, through to a product output region. The materials of different flowability are separated in that the more easily flowing materials—in the example of processing animal carcasses or parts thereof, the meat—are pressed at least partially into the hollow drum and discharged from there. The less easily flowing materials—again, in the example of processing animal carcasses or parts thereof, the bones, tendons, skin etc.—are collected in the product output region behind the hollow drum in the conveying direction F of the product stream, and discharged. The part of the product stream which has been pressed through the perforated peripheral surface M into the interior of the hollow drum is discharged and conducted for further processing. However, the remaining part of the product stream, which has not been pressed into the interior of the hollow drum through the perforated peripheral surface M, together with its less easily flowing constituents, normally adheres at least partially to the outside of the peripheral surface of the hollow drum. This residual product stream adhering to the outside of the hollow drum may be detached for example by scraper means.

Such apparatuses and methods are used in various industrial sectors, in particular however in the foodstuff industry. With the apparatuses described above, which are also known as separating devices or separators, various types of materials can undergo a separation process. For this, the materials to be separated, i.e. the pressed products or separating products or separates, are supplied in a product stream into the region of the product intake wedge. The product intake wedge is formed by the arrangement of the compression belt to the hollow drum, and leads to an (inlet) angle in the inlet area E of the product stream into the apparatus. The rotational drive of the hollow drum and/or the circulating drive of the compression belt draws in the product stream in the inlet area E between the hollow drum and the compression belt in the conveying direction F, so that a distance/gap (filled with product stream) exists between the compression belt and the hollow drum. The size of the (inlet) angle is important for optimal intake of the product stream and should therefore be kept as constant as possible, corresponding to the selected setting.

The product stream is pressed against the perforated peripheral surface M of the hollow drum from the outside by means of the compression belt or any other pressing element. Under this pressure, the more easily flowing constituents of the product stream are pressed through the perforations of the peripheral surface M into the inner hollow chamber of the rotating hollow drum, while the less easily flowing constituents of the product stream remain on the outside on the peripheral surface M of the hollow drum, and in some cases are discharged in the outlet area behind the hollow drum in the conveying direction F. On intake of the product stream between the hollow drum and the compression belt on the one hand, and during the actual separating process, substantial pressures occur and act on the hollow drum and pressing element, in particular on the at least slightly elastic compression belt, such that undesirable overstretching may occur. The load occurs in the entire pressure zone, i.e. in the region in which the compression belt is wrapped around the hollow drum. Particular load peaks, e.g. from undesirably large pressed product pieces, occur in the inlet area between the compression belt and the hollow drum. In order to counter these pressures or at least partially suppress or minimize a deflection and overstretching of the compression belt, a support apparatus is provided on the side of the compression belt opposite the hollow drum.

WO 2011/092087 discloses several rollers as support elements which form the support apparatus. The rollers or rolls are at least partially guided in elongated holes and spring-loaded so that they can deflect as the pressure increases. However, these support elements are only designed for an individual application. Accordingly, the known solution is inflexible and unreliable, since it is not possible to react either spontaneously, i.e. from the process, or to expected load cases, so that due to the pressure occurring during the separating process between the compression belt and perforated hollow drum on the one hand, and the friction occurring during the separating process between the compression belt and the hollow drum on the other hand, despite the spring-mounted support elements, substantial wear can occur in particular to the compression belt, which must accordingly be replaced regularly. The downtimes furthermore lead to a loss of performance of the apparatus.

The invention is thus based on the object of creating a low-wear, flexible apparatus, i.e. one which can be used for different load cases, with improved performance. The object is furthermore to propose a corresponding method.

This object is achieved by an apparatus of the type cited hereinbefore in which the spring force of at least some rollers is controllable. Because the spring force of at least some rollers of the support element can be adjusted, the support element and hence also the compression belt can firstly be preset for different load cases, and secondly adapted to unforeseen load cases. The controllability/adjustability of the spring force of at least some rollers also allows uneven load cases to be avoided completely. The design according to the invention thus guarantees a high flexibility and improved service lives of the hollow drum and in particular the compression belt, since load peaks can be compensated or avoided.

A preferred embodiment is characterized in that the spring force of at least the roller(s) of the roller track situated in the inlet area E is controllable. This means the or each roller which is arranged in the region of the product intake wedge on the side of the compression belt opposite the hollow drum. Because of the controllable spring force of precisely this (these) roller(s), it is ensured that the size of the (inlet) angle, which is important for optimum intake of the product stream, can be kept as constant as possible despite changing load cases, whereby firstly the service life in particular of the compression belt and secondly the performance of the apparatus can be improved.

An advantageous development is distinguished in that all rollers of the roller track are spring-mounted, wherein the spring force is controllable individually for each roller during operation of the apparatus. Thus the compression belt is flexibly and individually supported as evenly and broadly as possible over the entire pressure zone, over which the roller track with its rollers extends in the circumferential region of the hollow drum.

Advantageously, at least one proportional valve is assigned to the or each roller for active adjustment of the spring force. By means of the proportional valves, the respective spring force e.g. of the pneumatic or hydraulic cylinder, can be controlled/adjusted rapidly and precisely in order to allow an immediate reaction to different load cases.

A particularly preferred embodiment is characterized in that each proportional valve is connected to a control and/or regulating device. Such a control and/or regulating device guarantees adaptation of the support element to the product stream to be separated, in order to ensure a fault-free and wear-optimized operation of the apparatus, and at the same time provide a yield-efficient separating process.

Particularly preferably, a detection device is assigned to the apparatus, which detection device is configured and designed to detect product-specific data of the inflowing product stream as process parameters, wherein the detection device is connected to the control and/or regulating device. Detecting the process parameters of the product stream allows an even more flexible and individual setting of the respective spring force to be guaranteed.

Optionally, a detection device is assigned to the apparatus, which detection device is configured and designed to detect apparatus-specific data as process parameters, wherein the detection device is connected to the control and/or regulating device. By detecting process parameters of the apparatus itself, the flexibility and individuality in setting the respective spring force can be even further improved.

Particularly preferably, the apparatus is characterized in that all proportional valves are connected to a common control and/or regulating device, wherein the control and/or regulating device comprises a data store and an evaluation unit for storing and/or processing preset process parameters and/or those determined during the process, such that the spring force of each roller can be controlled and/or regulated on the basis of the process parameters. The advantages described above can be achieved in a particularly efficient and reliable fashion with the described embodiment.

In an advantageous development, the detection device for detecting product-specific data comprises at least one sensor unit for detecting the volume and/or density and/or consistency of the product stream. By determining said data or comparable or further relevant data on the product stream, the setting of the spring force can be further optimized and specified in order to improve the flexibility and efficiency of the apparatus.

Preferably, the detection device for detecting apparatus-specific data comprises at least one sensor unit for detecting the pressure present at the proportional valves and/or the wear on the compression belt and/or the gap size between the compression belt and the hollow drum. By determining said data or comparable or further relevant data on the apparatus or its state, the setting of the spring force can be further optimized and specified in order to improve the flexibility and efficiency of the apparatus.

In a further preferred embodiment, the support apparatus comprises, as well as the roller track, a support chain as a support element, wherein the rollers of the roller track are then formed at least partially as sprockets. The additional support chain as a further support element allows the pressures occurring during the separating process to be absorbed better, which leads to less wear and increased efficiency.

Advantageously, the rollers are mounted on the frame structure with a quick-locking system. Firstly, simple and rapid exchange of rollers is guaranteed, which can reduce downtimes. Secondly, cleaning the rollers and also the apparatus as a whole is simplified.

This object is also achieved by a method with the steps cited hereinbefore, in that the spring force of at least some rollers is controllable.

Preferably, at least one proportional valve is assigned to each roller, and the proportional valves are connected to a control and/or regulating device so that the spring force of all rollers is actively adjusted.

Particularly preferably, by means of a detection device, product-specific data of the inflowing product stream are detected as process parameters, and apparatus-specific data of an apparatus for separating materials of different flowability that are mixed together are detected as process parameters. Detection may take place by separate detection devices or by a common detection device.

Advantageously, the spring force of the rollers is controlled and/or regulated on the basis of process parameters which are present and/or determined during the process.

Particularly preferably, the method is carried out with an apparatus as disclosed herein.

The advantages resulting from the method steps have already been described in connection with the apparatus, so to avoid repetition, reference is made to the above statements.

BRIEF DESCRIPTION OF THE DRAWINGS

Further suitable and/or advantageous features and refinements of the apparatus and method are also disclosed. Particularly preferred embodiments of the apparatus and method are explained in more detail with reference to the appended drawing. The drawing shows:

FIG. 1 is a diagrammatic depiction of a preferred embodiment of the apparatus according to the invention.

DETAILED DESCRIPTION OF THE PREFERRED EMBODIMENT

The apparatus shown in the drawing serves to separate meat, on the one hand, and from bones, bone residue, tendons, cartilage and similar, on the other hand, and has a plurality of preferred features. Other embodiments, which may have fewer or other features, are not illustrated explicitly. The apparatus may also be used in the same fashion for separating e.g. fruit flesh from cores, or for separating any other mixed materials of different flowability.

The apparatus 10 is configured and equipped for separating materials of different flowability that are mixed together and comprises a frame structure 11; a hollow drum 12 with perforated peripheral surface M which is driven in rotation and mounted on the frame structure 11; a continuous compression belt 13 which can be pressed against said peripheral surface M from the outside when wrapped around part of the circumference of said hollow drum 12 and which is driven in circulation; a product intake wedge 14 formed by the compression belt 13 and hollow drum 12 for conducting a product stream, comprising a product to be pressed, into the apparatus 10 between the hollow drum 12 and the compression belt 13 in an inlet area E of the product stream; and a support apparatus 15 for the compression belt 13, with at least one support element 16 which is arranged on the side of the compression belt 13 opposite the hollow drum 12, wherein the support element 16 is configured as a roller track 17 comprising several rollers 18 which are arranged successively in the conveying direction F of the product stream and are at least partially spring-mounted.

This apparatus 10 is distinguished according to the invention in that the spring force of at least some rollers 18 is controllable. This means that at least one of the rollers 18, preferably however two or more rollers 18, of the roller track 17 is/are configured and designed so that its/their spring force can be adjusted.

The features and developments described below, viewed alone or in combination, constitute preferred embodiments. It is expressly pointed out that features which are grouped together in the claims and/or description and/or drawing, or described in a common embodiment, may also functionally independently refine the above-mentioned apparatus 10.

The frame structure 11 may be for example a closed or at least partially closed housing or profile structure or similar. Preferably, the housing is closed on all sides. The drive unit (not shown) for the hollow drum 12 and/or the compression belt 13 is arranged on or in the frame structure 11. The drive unit may comprise a common drive or separate drive means. The axis of rotation A of the hollow drum 12 runs transversely to the conveying direction F of the product stream. Bores/openings 19 are formed in the perforated peripheral surface M of the hollow drum 12, and may be arranged in different patterns; these allow the passage of parts of the product stream, in particular the more easily flowing, soft and crushable parts, into the interior of the hollow drum 12.

The compression belt 13 preferably consists of an elastic material e.g. rubber, polyurethane or similar, and is guided over several deflection elements 20. Preferably, one deflection element 20 is configured and designed as a drive roller 21. Particularly preferably, the deflection element 20 which is placed behind the hollow drum 12 in the conveying direction F, is the drive roller 21 for drawing the compression belt 13 and hence the product stream over the hollow drum 12. Particularly preferably, the drive roller 21 is simultaneously designed and configured as a pressing roller and/or tensioning roller for the compression belt 13. For this, the drive roller 21 is designed to be adjustable. The separate drive for the hollow drum 12 may further support the conveying of the product stream in the conveying direction F.

Preferably, the spring force of at least the roller(s) 18 of the roller track 17 which is/are situated in the inlet area E is controllable. Load peaks occur in particular in the inlet area E in which the product stream is "threaded" between the hollow drum 12 and the compression belt, so that to maintain the (inlet) angle, the compression belt 13 can be supported individually by the roller(s) with controllable/ adjustable spring force.

Particularly preferably, all rollers 18 of the roller track 17 are spring-mounted, wherein the spring force is controllable individually for each roller 18 during operation of the apparatus 10. In comparison with a common and synchronous control of all rollers 18, which is also possible, separate control of each roller 18 guarantees a greater flexibility. The quasi-online adjustability of the spring force during operation of the apparatus 10 allows direct reaction to load states, namely precisely in the region of the pressure zone D in which adaptation of the spring force is necessary or desirable.

The spring mounting of the rollers 18 may be implemented in various ways. For example, the spring force may be adjusted via pneumatic cylinders or hydraulic cylinders. Particularly preferably, at least one proportional valve 22 is assigned to the or each roller 18 for active adjustment of the spring force. The or each proportional valve 22 may be assigned e.g. to the pneumatic cylinder or the hydraulic cylinder, in order to variably adjust the spring force of the roller 18. For active adjustment, each proportional valve 22, or any other means for controlling and/or regulating the spring force, is connected to a control and/or regulating device 23. Several individual control and/or regulating devices 23 may be provided. Preferably, a common control and/or regulating device 23 is provided, to which other components of the apparatus 10 may also be connected, e.g. drives for the hollow drum 12 and/or the compression belt 13, and actuator elements for the drive roller 21.

In a preferred development of the apparatus 10, this comprises a detection device 24 which is designed and adapted to detect product-specific data of the inflowing product stream as process parameters, wherein the detection device 24 may be and preferably also is connected to the control and/or regulating device 23. Because the apparatus 10 has such a detection device 24, the respective current operating state with respect to the product stream can be determined, so that the spring forces may be adapted not only to preset and hence expected operating states but also to unexpected and above all changing operating states. Particularly preferably, the detection device 24 for detecting product-specific data comprises at least one sensor unit 25 for detecting the volume and/or the density and/or the consistency of the product stream, and further product-specific data such as e.g. product type, composition of the product stream etc. The sensor unit 25 may comprise e.g. optical, magnetic, mechanical, capacitative and other sensor means. Instead of the sensor unit 25 or in addition thereto, e.g. an X-ray unit and/or a camera unit may be provided, and/or any other known unit which is designed and adapted for detecting product-specific data on the product stream.

Optionally, a detection device 26 is assigned to the apparatus 10, and is configured and designed to detect apparatus-specific data as process parameters, wherein the detection device 26 may be and also is connected to the control and/or regulating device 23. Because the apparatus 10 comprises such a detection device 26, the respective current operating state with respect to the apparatus 10 can be determined, so that the spring forces may be adapted not only to preset and hence expected operating states but also to unexpected and above all changing operating states. Particularly preferably, the detection device 26 for detecting apparatus-specific data comprises at least one sensor unit 27 for detecting the pressure applied to the proportional valves 22 and/or the wear on the compression belt 13 and/or the gap size between the compression belt 13 and the hollow drum 12, and further apparatus-specific data such as e.g. the expansion of the compression belt etc. The sensor unit 27 may comprise e.g. optical, magnetic, mechanical, capacitative and other sensor means. Instead of the sensor unit 25 or in addition thereto, e.g. an X-ray unit and/or a camera unit may be provided, and/or any other known unit which is designed and configured for detecting apparatus-specific data.

In the diagrammatic drawing, the apparatus 10 is preferably characterized in that all proportional valves 22 are connected to a common control and/or regulating device 23, wherein the control and/or regulating device 23 comprises a data store 28 and an analysis unit 29 for storing and/or processing process parameters which are preset and/or determined during the process, such that the spring force of each roller 18 can be controlled and/or regulated on the basis of the process parameters. The control and/or regulating device 23 may be connected to a commercial personal computer (PC) or any other computer unit. The control and/or regulating device 23 and/or the PC may be formed separately and assigned to the apparatus 10, or be an integral part of the apparatus 10.

The apparatus 10 is substantially made of stainless steel. This applies in particular to the frame structure 11 and the hollow drum 12. Evidently, other materials are also possible. The compression belt 13 is preferably made of a flexible material. The rollers 18 are preferably made of a material approved for use in the foodstuff-processing industry, in particular plastic. Other permitted materials may however also be used, in particular if they are easy to clean and wear-resistant, on the one hand, and have a low weight, on the other hand.

In a further preferred embodiment (not illustrated explicitly), the support apparatus 15 comprises, as well as the roller track 17, a support chain as a support element 16, wherein the rollers 18 of the roller track 17 are then formed at least partially as chain wheels. Irrespective of whether they act directly on the compression belt 13 as the support element 16, or act indirectly on the compression belt 13 via the support chain, the rollers 18 may be mounted fixedly but releasably on the frame structure 11. Preferably, in contrast to a fixed but releasable attachment, the rollers 18 are mounted on the frame structure 11 by means of a quick-locking system. In this way, the rollers 18 can be released and refitted easily and rapidly in the case of maintenance or cleaning, preferably without the use of tools.

Optionally, scraper elements may be arranged in the inlet area i.e. above the product intake wedge 14, and/or in the outlet area i.e. behind the hollow drum 12 (also known as a perforated drum) in the conveying direction F. These scraper elements may be mounted rigidly, i.e. with a fixed distance from the hollow drum 12 or more precisely from the peripheral surface M, or controllable variably, i.e. their distance from the hollow drum 12 or more precisely the peripheral surface M can be changed. The hollow drum 12 and the compression belt 13 may be driven with the same speed. Optionally, the hollow drum 12 and the compression belt 13 may also be driven with different speeds. The speed difference is controllable and/or regulatable by means of the control and/or regulating device 23.

The method is described in more detail below with reference to the drawing. The method serves, and is accordingly configured and designed, for separating materials of different flowability that are mixed together. Firstly, a product stream, comprising a product to be pressed, is supplied to a product intake wedge 14 which is formed by a hollow drum 12 with perforated peripheral surface M and a compression belt 13, which lies on the hollow drum 12 from the outside, wrapped around part of the circumference. For the separating process, the hollow drum 12 and the compression belt 13 are driven in circulation in order to draw in the product stream between the hollow drum 12 and the compression belt 13. Preferably, the hollow drum 12 is driven clockwise (in the view in FIG. 1), while the drive roller 21 for the compression belt is driven counterclockwise (in the view in FIG. 1), so that the hollow drum 12 and the compression belt 13 have the same transport direction in the region of the wrapping, i.e. in the pressure zone D, wherein the transport speeds may be the same or different from one another. By transport of the product stream along the pressure zone D, the more easily flowing constituents of the product stream are pressed into the inner hollow chamber of the hollow drum 12 by means of the compression belt 13, through the perforations of the peripheral surface M of the hollow drum 12, and discharged, while the less easily flowing constituents of the product stream remain on the outside of the peripheral surface M of the hollow drum 12 and are discharged separately. During separation of the product stream into its constituent parts, on the side of the compression belt 13 opposite the hollow drum 12, the compression belt 13 is supported by a roller track 17 as a support element 16, which comprises several at least partially spring-mounted rollers 18 arranged successively in the conveying direction (F) of the product stream.

This method is distinguished according to the invention in that the spring force of at least some rollers 18 is controlled. Advantageously, the spring force of the rollers 18 is controlled and/or regulated on the basis of process parameters which are preset and/or determined during the process.

The spring force may be adjusted in various ways. Particularly preferably, at least one proportional valve 22 is assigned to each roller 18, and the proportional valves 22 are connected to a control and/or regulating device 23 so that the spring force of all rollers 18 is actively adjusted. For example, the spring pressure of individual or several or all rollers 18 may be increased if a product stream of higher density is to be separated into its constituent parts. In another example, the spring pressure of individual or several or all rollers 18 may be reduced if the extension of the compression belt 13 exceeds a limit value. The spring pressure may be adjusted depending on process parameters, which are preset or which change during the separating process, of the product stream and/or apparatus 10 itself For this, a detection device 24 detects product-specific data of the inflowing product stream as process parameters. By means of a detection device 26, apparatus-specific data of an apparatus 10 for separating materials of different flowability that are mixed together are detected as process parameters. The results of detection of the process parameters or corresponding data are stored and/or processed so that the control and/or regulating device 23 can adjust the spring force of each roller 18 individually on the basis of the data before commissioning of the apparatus 10 or during operation of the apparatus 10.

Particularly preferably, the method is carried out with an apparatus as described above.

The invention claimed is:

1. An apparatus for separating materials of different flowability that are mixed together, comprising:
   a frame structure;
   a hollow drum with a perforated peripheral surface which is driven in rotation and mounted on the frame structure;
   a continuous compression belt which is pressed against said peripheral surface from outside when wrapped around part of a circumference of said hollow drum and which is driven in circulation;
   a detection device which detects product-specific data of a product stream as process parameters, wherein the detection device is connected to a control and/or regulating device;
   a product intake wedge formed by the compression belt and hollow drum for conducting the product stream, comprising a product to be pressed, into the apparatus between the hollow drum and the compression belt in an inlet area of the product stream; and
   a support apparatus for the compression belt, with at least one support element which is arranged on a side of the compression belt opposite the hollow drum;
   wherein the support element is a roller track comprising several rollers which are arranged successively in the conveying direction of the product stream and at least partially spring-mounted, the spring force of at least individual ones of the several rollers being controlled by the control and/or regulating device based on the detected product-specific data.

2. The apparatus according to claim 1, wherein the spring force of at least one of the rollers of the roller track situated in the inlet area is controllable.

3. The apparatus according to claim 1, wherein all rollers of the roller track are spring-mounted, wherein the spring force is controllable individually for each roller during operation of the apparatus.

4. The apparatus according to claim 1, further comprising at least one proportional valve assigned to the or each roller for active adjustment of the spring force.

5. The apparatus according to claim 4, wherein each proportional valve is connected to the control and/or regulating device.

6. The apparatus according to claim 5, further comprising a detection device assigned to the apparatus, which detection device is configured and designed to detect apparatus-specific data as process parameters, wherein the detection device is connected to the control and/or regulating device.

7. The apparatus according to claim 5, wherein all proportional valves are connected to a common control and/or regulating device, wherein the control and/or regulating device comprises a data store and an analysis unit for storing and/or processing process parameters which are preset and/or determined during the process, such that the spring force of each roller can be controlled and/or regulated on the basis of the process parameters.

8. The apparatus according to claim 5, wherein the detection device comprises at least one sensor unit for detecting a volume and/or density and/or consistency of the product stream.

9. The apparatus according to claim 6, wherein the detection device for detecting apparatus-specific data comprises at least one sensor unit for detecting a pressure present at the proportional valves and/or wear on the compression belt and/or a gap size between the compression belt and the hollow drum.

10. The apparatus according to claim 1, wherein the support apparatus comprises, in addition to the roller track, a support chain as a support element, wherein the rollers of the roller track are then formed at least partially as chain wheels.

11. The apparatus according to claim 1, wherein the rollers are mounted on the frame structure by a quick-locking system.

12. A method for separating materials of different flowability that are mixed together, comprising the steps:
   supplying a product stream, comprising a product to be pressed, into a product intake wedge which is formed by a hollow drum with a perforated peripheral surface and a compression belt which lies on the hollow drum from outside, wrapped around part of a circumference of the hollow drum;
   driving the hollow drum and/or the compression belt in circulation in order to draw in the product stream between the hollow drum and the compression belt; and
   detecting product-specific data of the inflowing product stream as process parameters by means of a detection device;
   wherein more easily flowing constituents of the product stream are pressed into an inner hollow chamber of the hollow drum by means of the compression belt through the perforations of the peripheral surface of the hollow drum and discharged, while less easily flowing constituents of the product stream remain on the outside of the peripheral surface of the hollow drum and are discharged separately;
   wherein on a side of the compression belt opposite the hollow drum, the compression belt is supported by a roller track as a support element, which comprises several at least partially spring-mounted rollers arranged successively in the conveying direction of the product stream, the spring force of at least some rollers being controlled based on the detected product-specific data.

13. The method according to claim 12, further comprising at least one proportional valve assigned to each roller, and the proportional valves are connected to a control and/or regulating device so that the spring force of all rollers is actively adjusted.

14. The method according to claim 12, further comprising detecting apparatus-specific data of an apparatus for separating materials of different flowability that are mixed together as process parameters by means of a detection device.

15. The method according to claim 12, wherein a spring force of the rollers is controlled and/or regulated on a basis of process parameters which are preset and/or determined during the process.

16. The method according claim 12, wherein the method carried out with an apparatus according to claim 1.

17. The method according to claim 12, wherein the detection device comprises at least one sensor unit for detecting a volume and/or density and/or consistency of the product stream.

18. The method according to claim 12, wherein the product-specific data comprises a volume of the product stream, a density of the product stream, a consistency of the product stream, a composition of the product stream, a product type, or combinations thereof.

19. The apparatus according to claim 1, wherein the product-specific data comprises a volume of the product stream, a density of the product stream, a consistency of the product stream, a composition of the product stream, a product type, or combinations thereof.

* * * * *